Figure 1:
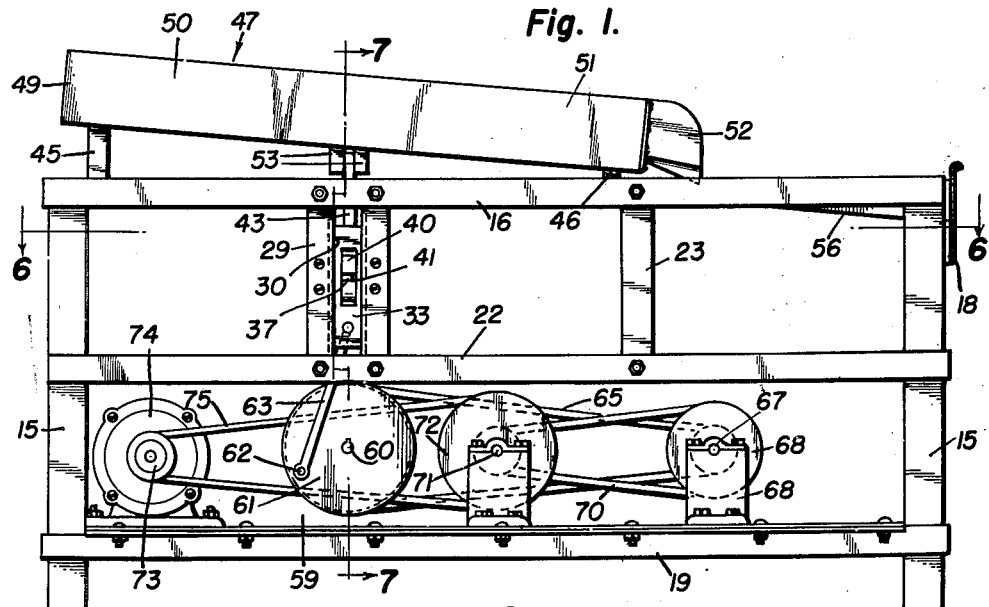

April 11, 1950     W. F. MURRAY     2,504,037
CANDY COATING MACHINE
Filed Nov. 25, 1946     4 Sheets-Sheet 1

Inventor
William F. Murray

By *Clarence A. O'Brien and Harvey B. Jacobson*
Attorneys

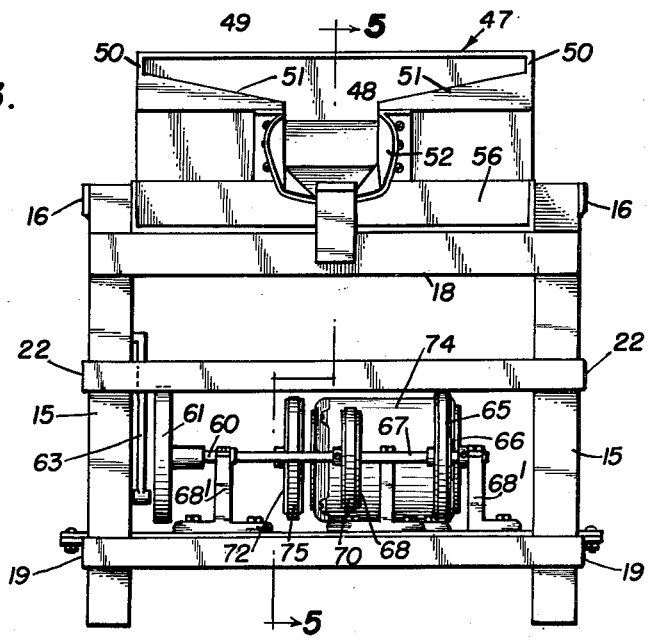
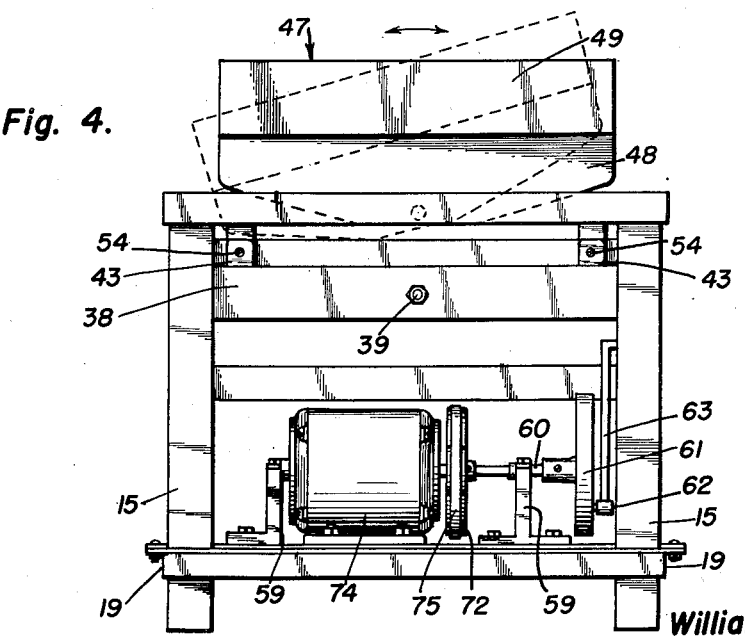

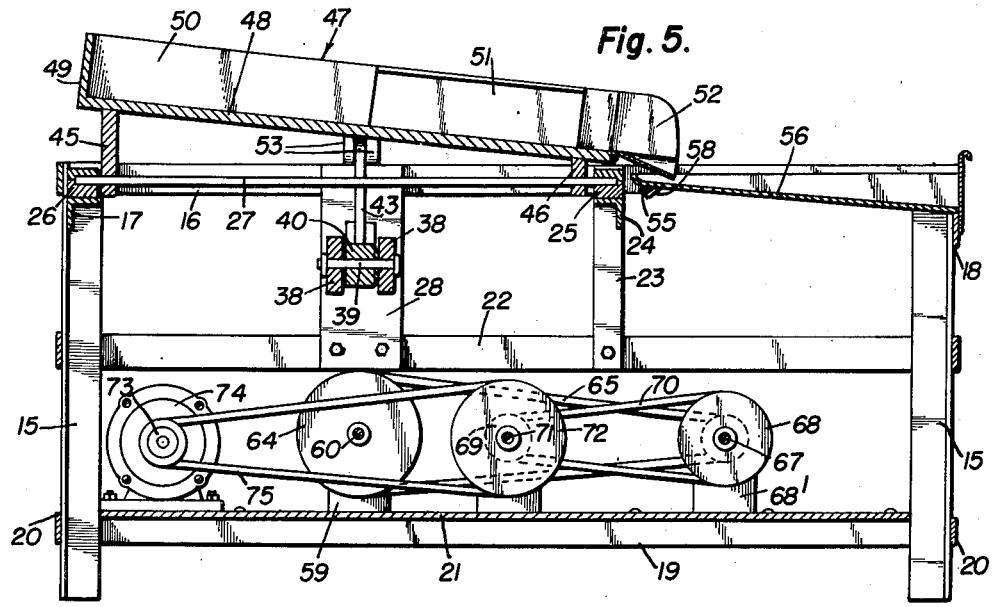
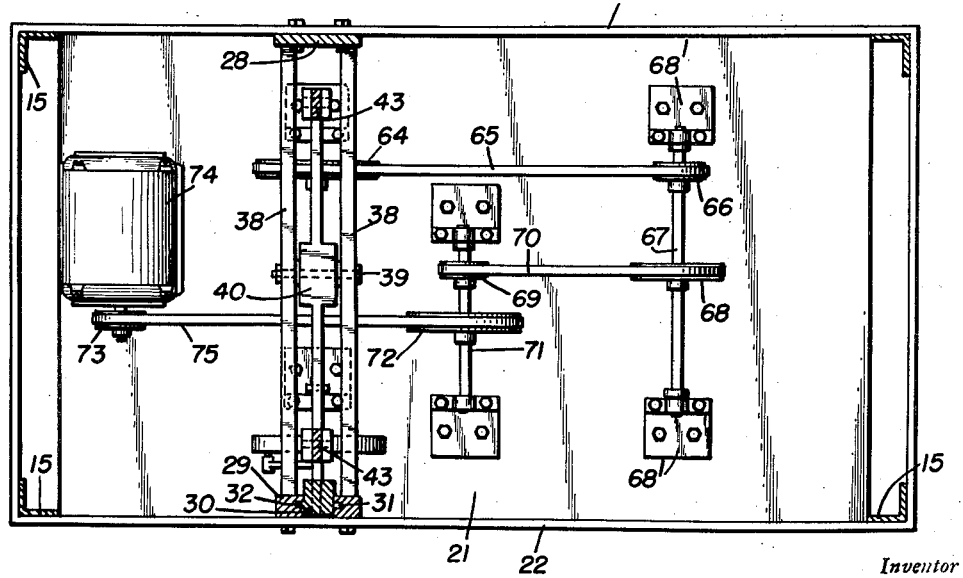

April 11, 1950     W. F. MURRAY     2,504,037
CANDY COATING MACHINE

Filed Nov. 25, 1946     4 Sheets-Sheet 4

Inventor
William F. Murray

By *Clarence A. O'Brien and Harvey B. Jacobson*
Attorneys

Patented Apr. 11, 1950

2,504,037

UNITED STATES PATENT OFFICE 2,504,037

CANDY COATING MACHINE

William F. Murray, Washington, D. C.

Application November 25, 1946, Serial No. 712,099

2 Claims. (Cl. 107—1)

This invention relates to a candy coating machine and has for its primary object to distribute a coating of granular substances, such as broken nut meats, granulated sugar, or like edible substances upon a core of candy or the like having a tacky surface.

Another object is to easily and quickly coat tacky candy cores with granular substances and under sanitary conditions.

A further object is to dispense with the hand labor commonly employed in producing coated candy.

The above and other objects may be attained by employing this invention which embodies, among its features, an inclined hopper mounted to rock about a horizontal axis, a discharge spout at the lower edge of the hopper, means to rock the hopper about said axis, and an inclined receiving tray onto which the coated candy is deposited through the discharge spout.

Other features include a drive motor and speed reducing means coupling the drive motor with the hopper rocking means in order that the rocking may be accomplished at a proper speed.

Figure 2:
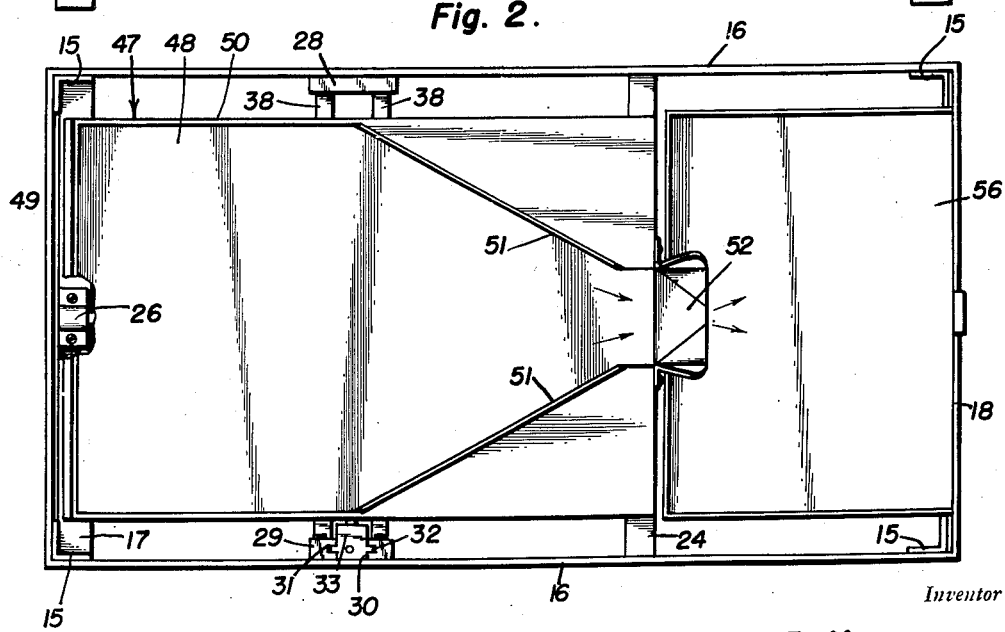
Figure 7:
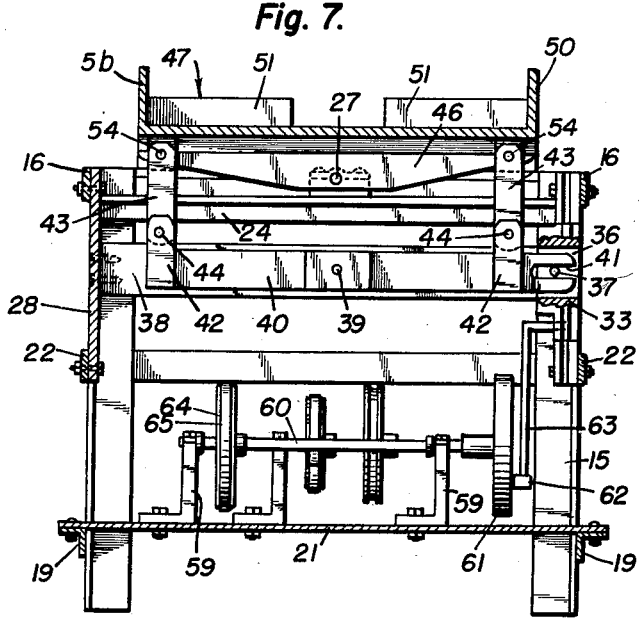
Figure 8A:
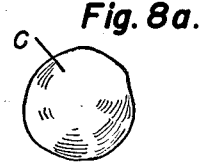
Figure 8B:
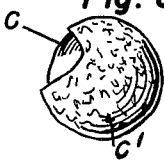
Figure 9:
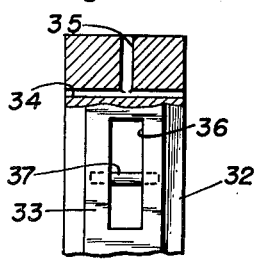

In the drawings:

Figure 1 is a side view of a candy machine embodying the features of this invention, Figure 2, is a top plan view of Figure 1, Figure 3 is an end view of Figure 1 on the discharge end of the hopper, Figure 4 is an end view from the opposite end of the machine, Figure 5 is a longitudinal sectional view through the machine, taken substantially along the line 5—5 of Figure 3, Figure 6 is a horizontal sectional view taken substantially along the line 6—6 of Figure 1, Figure 7 is a transverse sectional view through the machine taken substantially along the line 7—7 of Figure 1, Figure 8a is a view of a sphere of candy having a tacky surface to which the granular coating adheres, Figure 8b is a view similar to Figure 8a showing the sphere after being coated, and Figure 9 is an enlarged fragmentary view partially in section of the cross-head.

Referring to the drawings in detail, my improved candy machine embodies a main frame composed of vertically extending legs 15 carrying, at their upper ends, side rails 16, and slightly below their upper ends, transversely extending end rails 17 and 18. Extending longitudinally along opposite sides of the legs 15 near their lower ends are side rails 19 and extending transversely across opposite ends of the machine in the same plane with the side rails 19 are end rails 20 forming, in conjunction with the rails previously described, a rigid frame. A platform 21 is supported on the side rails 19 and forms the bed plate upon which the motor and speed reducing mechanism, to be more fully hereinafter described, is mounted. Extending longitudinally along opposite sides of the machine and fixed to the legs 15 intermediate their upper and lower ends are side rails 22, to which are attached intermediate their ends vertically extending standards 23, the upper ends of which are attached to the side rails 16. The standards 23 are joined to one another transversely of the machine by a transverse supporting rail 24 which lies in the same horizontal plane with the end rail 17 and supports, intermediate its ends, a suitable journal bearing 25. A similar journal bearing 26 is carried by the rail 17, and supported in the bearings 25 and 26 is a horizontally disposed rock shaft 27, the purpose of which will be more fully hereinafter explained.

Extending between the rails 22 and 16 on opposite sides of the frame between the rails 17 and 24 are supporting plates 28 and 29, respectively. The plate 29 is provided with a longitudinally extending slot 30, opposite side walls of which are provided with opposed grooves 31 for the reception of guide flanges 32 formed along opposite longitudinal side edges of a cross-head 33. This cross-head is provided, near its upper end, with a transversely extending bore 34, and opening into the bore 34 is a longitudinal bore 35, through which lubricants may be introduced into the bore 34 for distribution along the walls of the flanges 32 and the grooves 31. Formed in the cross-head 33, slightly below the transversely extending bore 34, is an elongated slot 36 transversely of which is extended a cross pin 37, the purpose of which will be more fully hereinafter explained.

Extending transversely of the machine, substantially midway between the upper and lower ends of the plates 28 and 29, are supporting bars 38. These bars are arranged in spaced parallel relation, as will be readily understood upon reference to Figure 6, and supported midway between opposite ends of the supporting bars 38 and in spaced parallel relation with the rock shaft 27 is a pivot 39. A walking beam 40 is supported midway of its length on the pivot 39 and one end of the walking beam is bifurcated, as at 41, to enter the opening 36 of the cross-head 33 and straddle the pin 37, so that, as the cross-head 33 is moved vertically in its guides, the walking beam will oscillate about its pivot 39. Secured to the walking beam adjacent opposite ends are upwardly extending brackets 42 to which links 43 are pivoted, as at 44, for a purpose to be more fully hereinafter described.

Mounted adjacent opposite ends of the rock shaft 27 to rock about the longitudinal axis thereof are supporting bolsters 45 and 46. These bolsters support a hopper, designated generally 47, which comprises a bottom 48, a closed end wall 49, and side walls 50. As illustrated in Figure 2, the side walls extend in substantially spaced parallel relation from their junction with the end wall 49 to a point substantially midway between opposite ends of the bottom 48 and then converge inwardly, as at 51, toward a discharge spout 52. As illustrated in Figures 1 and 5, the bolster 45 is of greater width than the bolster 46, and being secured to the underside of the bottom 48 adjacent the end wall 49, it will be evident that the entire hopper 47 will lie in a plane which inclines downwardly toward the discharge spout 52. Depending from the underside of the hopper 47 adjacent opposite side edges thereof and intermediate its ends are spaced ears 53, between which the ends of the links 43 are pivotally supported as at 54 (Fig. 7) so that when the walking beam 40 oscillates about its pivot 39, the hopper 47 will move in unison therewith.

Extending transversely of the frame between the upper side rails 16 and adjacent the journal bearing 26 is a supporting rod 55, upon which one end of a receiving tray 56 is supported. The opposite end of the receiving tray 56 is supported on the cross-bar 18, and as illustrated in Figure 5, the bottom of the receiving tray inclines downwardly as it recedes from the bar 55. The receiving tray is removably mounted on the rod 55 and the supporting rail 18 and in order to retain the bottom of the tray into contact with the rod 55, the bottom is provided, adjacent opposite side edges, with spaced parallel incisions joined by perpendicular incisions to form downwardly bent tongues 58 (Fig. 5).

Mounted for rotation about a horizontal axis which extends transversely of the machine in suitable brackets 59 is a crankshaft 60 which lies in the same vertical plane with the longitudinal axis of the walking beam 40. A crank disk 61 is attached to one end of the crankshaft 60 and carries a crank pin 62 which is coupled by means of a connecting rod 63 with the crosshead 33. A drive pulley 64 is fixed to the crankshaft 60 and is coupled, through the medium of an endless belt 65 to a drive pulley 66 fixed to a jackshaft 67 which is mounted for rotation in suitable brackets 68 about an axis which lies parallel with the axis of the crankshaft 60. Fixed to the shaft 67 intermediate its ends is a drive pulley 68 which has driving connection with a drive pulley 69 through the medium of a drive belt 70. The pulley 69 is fixed to a driven shaft 71 which, in turn, is driven by a drive pulley 72 which has driving connection with the drive pulley 73 of a prime mover 74, such as an electric motor, through the medium of a drive belt 75. Due to the fact that the pulley 72 is of greater diameter than the pulley 73, the pulley 68 is of greater diameter than the pulley 69, and the pulley 64 is of greater diameter than the pulley 66, it will be obvious that the speed of rotation of the shaft 60 will be materially reduced over the speed at which the pulley 73 is driven.

In use, the granular material, such as broken nut meats, is placed in the hopper 47, after which a sphere C (Fig. 8a) of candy having a tacky surface is deposited in the tray and the machine set into operation. Due to the inclination of the hopper, it will be obvious that the sphere C will tend to move toward the discharge spout 52, and by reason of the oscillation of the hopper about the axis of the rock shaft 27, it will be obvious that the spherical body will be rolled from side to side as it progresses toward the discharge spout 52, it being understood of course that the drive motor 74 has been set into operation. Due to the tacky condition of the sphere C, it will be obvious that the granular substance will adhere thereto to form a coating C' thereon, as illustrated in Figure 8b. The candy thus coated will find its way to the discharge spout 52 to be deposited on the receiving tray 56, for subsequent removal and distribution. The spheres are preferably introduced into the hopper singly or one at a time and, through the constant rolling and turbulence the candy spheres while they contact the granular substance, they will become completely coated with the granular substance without requiring manual manipulation. In this way, not only are material savings in labor effected, but the sanitary condition of the finished product is preserved.

While in the foregoing there has been shown and described the preferred embodiment of this invention, it is to be understood that minor changes in the details of construction and combination and arrangement of parts may be resorted to without departing from the spirit and scope of the invention as claimed.

Having thus described my invention, what I claim as new and desire to protect by Letters Patent of the United States is:

1. In a candy coating machine of the type comprising an inclined hopper mounted on a horizontal axis to rock in an arc which lies perpendicular to the direction in which it inclines, means for rocking said hopper comprising a walking beam mounted beneath said hopper to rock in an arc which lies perpendicular to the direction in which the hopper inclines, links connected to the walking beam adjacent opposite ends thereof, said links being connected to the underside of the hopper adjacent each side thereof, a crosshead mounted to slide vertically adjacent one end of the walking beam and having an opening therein into which the adjacent end of the walking beam projects and a crank and pitman connected to the crosshead to impart vertical movement thereto.

2. In a candy coating machine of the type comprising an inclined hopper mounted on a horizontal axis to rock in an arc which lies perpendicular to the direction in which it inclines, means for rocking said hopper comprising a walking beam mounted beneath said hopper to rock in an arc which lies perpendicular to the direction in which the hopper inclines, links connected to the walking beam adjacent opposite ends thereof, said links being connected to the underside of the hopper adjacent each side thereof, a crosshead mounted to slide vertically adjacent one end of the walking beam and having an opening therein into which the adjacent end of the walking beam projects, a crank shaft mounted below the walking beam to rotate about a horizontal axis, speed reduction drive means connected to the crank shaft for imparting rotary movement thereto, a crank disk mounted on the crank shaft adjacent the end nearest the crosshead and a connecting rod coupled at one end to the crank disk and at its opposite end to the crosshead for imparting reciprocal motion to the crosshead as the crank disk rotates.

WILLIAM F. MURRAY.

REFERENCES CITED

The following references are of record in the file of this patent:

UNITED STATES PATENTS

| Number | Name | Date |
|---|---|---|
| 563,805 | Rockfellow | July 14, 1896 |
| 668,371 | Franklin et al. | Feb. 19, 1901 |
| 1,482,473 | Lord et al. | Feb. 5, 1924 |
| 1,739,642 | Light | Dec. 17, 1929 |
| 1,743,227 | Melville | Jan. 14, 1930 |
| 1,753,416 | Higgins et al. | Apr. 8, 1930 |
| 2,300,396 | Bookidis | Nov. 3, 1942 |
| 2,347,164 | Petrilli | Apr. 18, 1944 |